April 22, 1924.  
W. E. HOKE  
1,491,102  
METHOD OF AND MACHINE FOR MAKING GAUGES AND OTHER ARTICLES  
Filed July 8, 1919  3 Sheets-Sheet 3
Fig. 5.
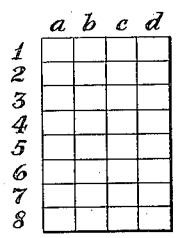
Fig. 6.
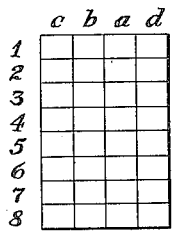
Fig. 8.
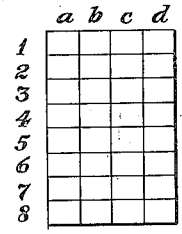
Fig. 7.
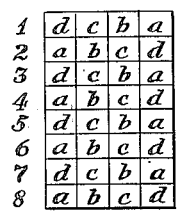
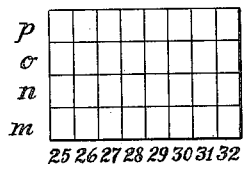
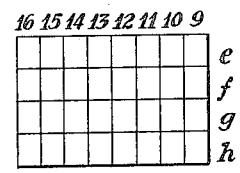
Fig. 9.
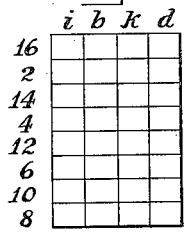
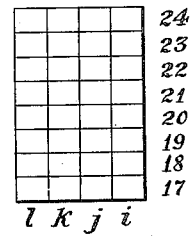
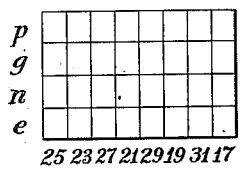
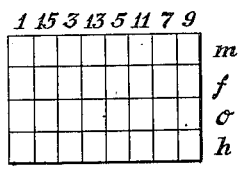
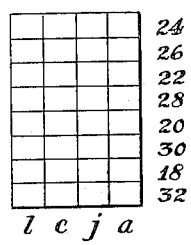
Inventor  
William E. Hoke  
By S. Jay Teller  
Attorney.

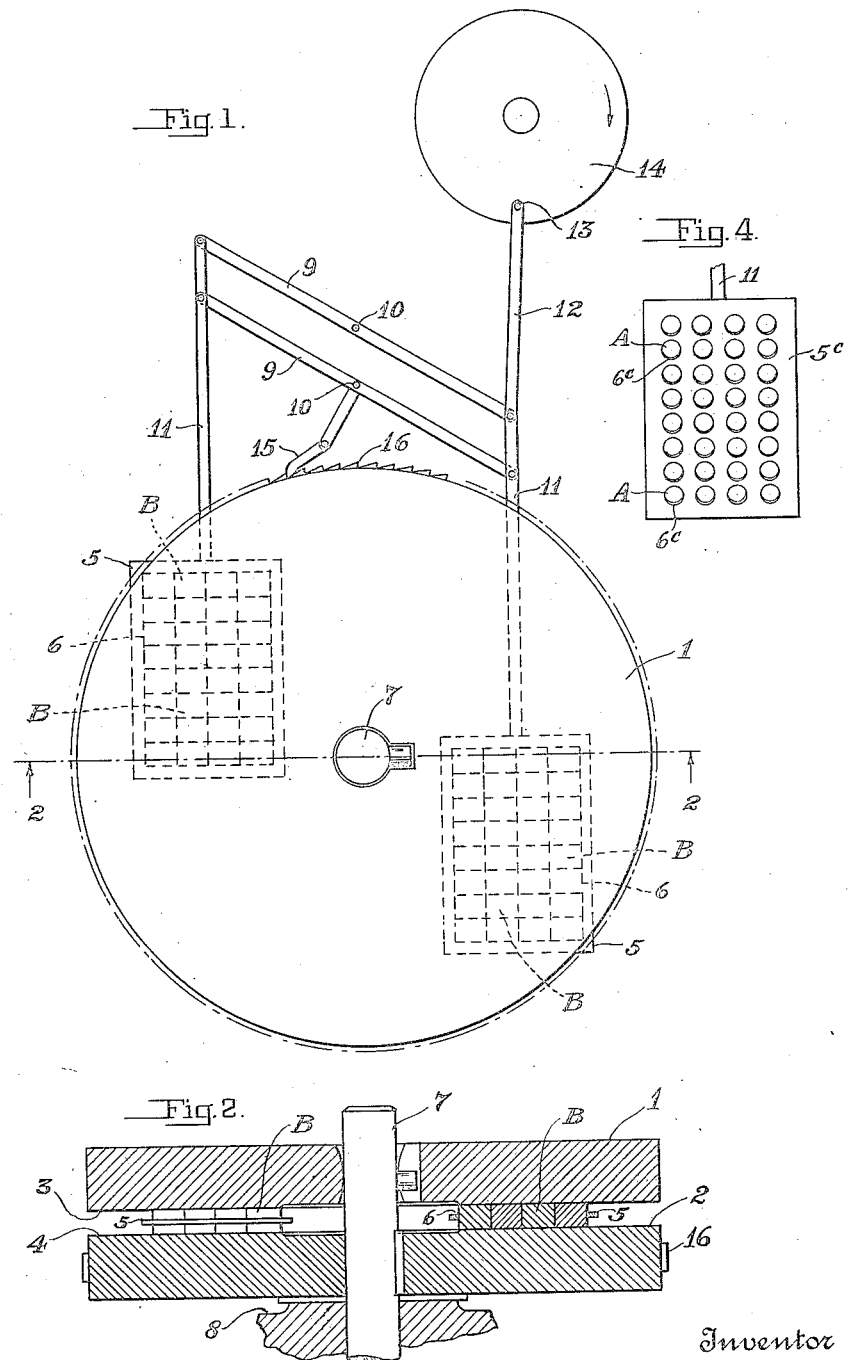

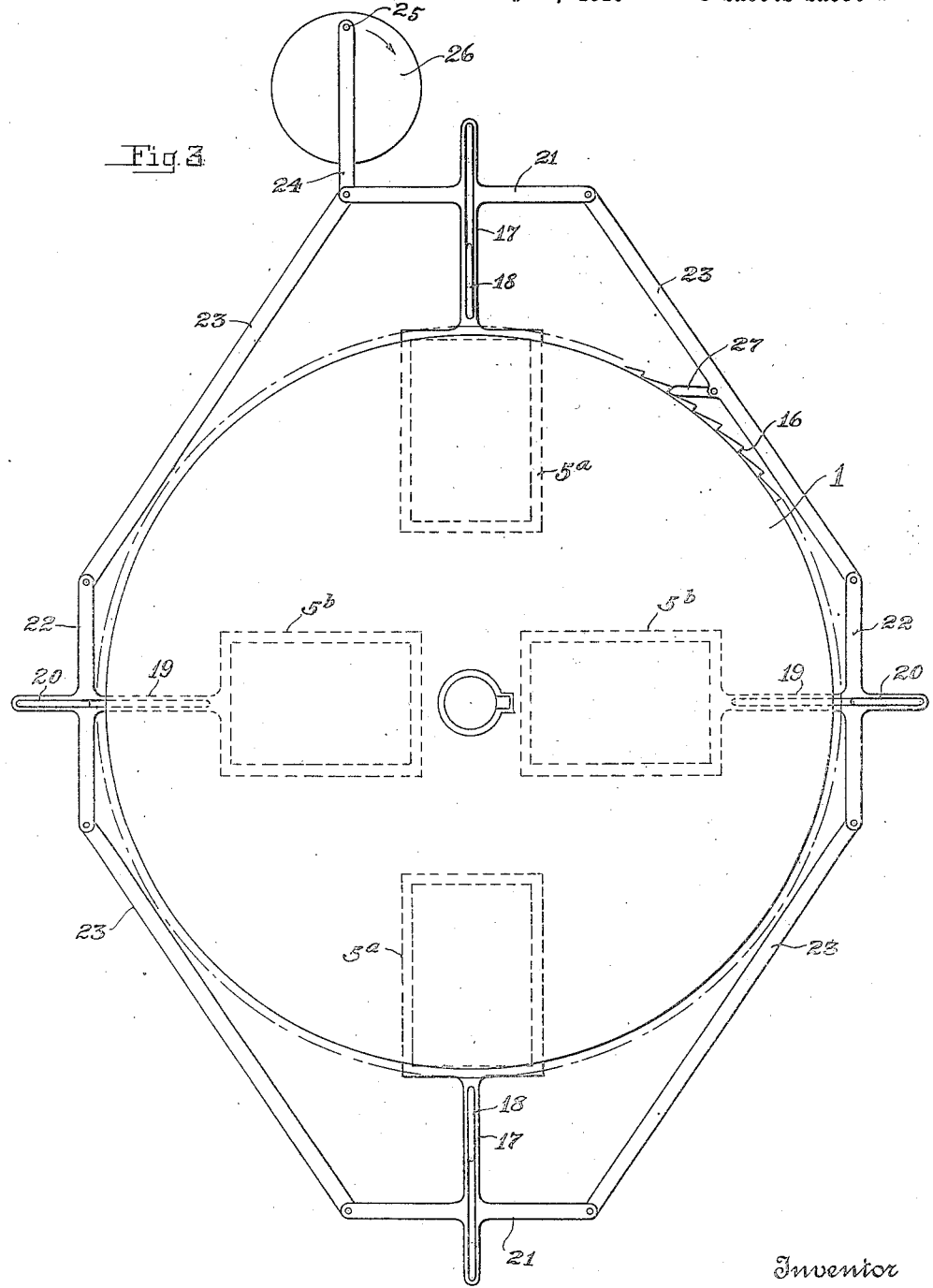

Patented Apr. 22, 1924.

1,491,102

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

METHOD OF AND MACHINE FOR MAKING GAUGES AND OTHER ARTICLES.

Application filed July 3, 1919. Serial No. 309,449.

*To all whom it may concern:*

Be it known that I, WILLIAM E. HOKE, a citizen of the United States, residing at St. Louis, Missouri, have invented certain new and useful Improvements in Methods of and Machines for Making Gauges and Other Articles, of which the following is a specification.

This invention relates to a method of lapping gauge blocks or similar articles to produce identical sizes, and particularly to produce plane parallel opposite surfaces separated from each other by an assigned dimension, with a high degree of accuracy. The method is in some respects similar to the methods set forth in my copending applications for method of making identical articles, Serial No. 252,073 filed August 30th, 1918, for method of and machine for making gauges and other articles, Serial No. 289,591 filed April 12th, 1919, and for method of and machine for making gauges and other articles, Serial No. 309,448, filed on even date herewith. The invention further relates to a machine whereby the method may be practiced.

In the accompanying drawings I have illustrated in diagrammatic form two different machines each embodying the mechanical features of the invention and each adapted for practicing the method. I have also presented further diagrams by which the method will be explained in detail. It will be understood that the drawings are for illustrative purposes only and are not to be construed as defining or limiting the scope of the invention, the claims appended to this specification being relied upon for that purpose.

Of the drawings:

Fig. 1 is a plan view of one machine.

Fig. 2 is a sectional view taken along the line 2—2 of Fig. 1.

Fig. 3 is a plan view of another machine.

Fig. 4 is a fragmentary view of a different form of plate that may be used for moving the blocks.

Figs. 5 to 9 are diagrammatic views further illustrating the method.

The blocks to be lapped are first formed with the desired shape and with a little more than the desired length, by any usual or preferred means. When they are to be used as gauges the blocks are hardened and otherwise suitably treated, but these preliminary steps constitute no part of the present invention. After the blocks have been thus formed and treated, they are then subjected to a lapping operation or a series of lapping operations and are otherwise acted upon, in the manner to be described.

Referring to Figs. 1 and 2 of the drawings, it will be seen that the machine includes two laps 1 and 2 of similar size and preferably circular in form, having their adjacent faces 3 and 4 made as nearly plane as possible in accordance with any method for producing plane surfaces. The adjacent surfaces of the two laps are suitably prepared and are charged with an abrasive such as fine emery. The character of the laps and of the abrasive may be varied as required. A number of similar blocks B—B are placed between the two laps 1 and 2, these blocks being arranged in at least one definite group, and preferably in two equal definite groups. For holding the blocks of each group in proper relationship and for other purposes, as will be presently described, there is provided a flat plate or spider 5. As shown in Figs. 1 and 2, each plate 5 has a large rectangular opening 6 which is of such size and shape as to be adapted to receive and hold the blocks of one group.

In order to cause lapping, relative movement is effected between the blocks and the laps, this movement preferably being effected by moving both the blocks and the laps. The laps are caused to contact with the blocks with a proper pressure, and while I do not so limit myself as concerns all features of the invention, this pressure is preferably secured by arranging the parts horizontally, as shown. The lower lap is secured to a vertical shaft 7 rotatable in a bearing in a support 8. The upper lap is loosely keyed to the shaft 7 so as to rotate therewith, but is movable vertically and can adjust itself with respect to the horizontal. The weight of the upper lap is utilized to secure the desired pressure between the laps and the blocks. The upper lap is supported entirely on the blocks, and if greater pressure is desired additional weight can be applied to the upper lap. The upper lap is entirely free as concerns vertical movement and it can adjust itself as to parallelism with the lower lap in accordance with the lengths of the blocks.

In accordance with the present invention the blocks are reciprocated and the laps are turned about their common axis. When two equal groups of blocks are provided as is preferred, they are so positioned with respect to the laps that the weight of the upper lap is equally divided between the two groups of blocks, and the reciprocating movements of the two groups of blocks are effected in such definite relation to each other that this equal distribution or balancing of the weight of the upper lap is always maintained. As the result of this equal distribution of the weight, I secure the same amount of pressure and hence the same amount of lapping on all of the blocks and I make it impossible for some of the blocks of one group to be reduced more rapidly than the blocks of the other group, or for the blocks at one side of a single group to be reduced more rapidly than those at the other side.

As shown in Figs. 1 and 2, the two plates 5, 5 are engaged by a suitable mechanism which serves to reciprocate them simultaneously in opposite directions. This mechanism may vary widely but for purposes of illustration I have shown two similar walking beams 9, 9 which are pivoted for movement about parallel axes at 10, 10. The walking beams are pivotally connected at their opposite ends to links 11, 11 which are rigidly connected with the respective plates 5, 5. For oscillating the two walking beams there is provided a connecting rod 12 engaging a pin 13 on a rotating crank disc 14. It will be seen that when the disc 14 is rotated, the two walking beams will be oscillated, thus causing the two plates 5, 5 to be regularly reciprocated in opposite directions. The walking beams serve as parallel motion links, thus holding the rods 11, 11 and the plates 5, 5 in parallelism as they reciprocate. Inasmuch as the two groups of blocks move oppositely, they are always symmetrically disposed with respect to the axis of the laps, the weight of the upper lap therefore being equally divided between them.

In order that the entire surfaces of the laps may be used, the two laps are turned preferably in unison as the plates 5, 5 are reciprocated. Any desired mechanism may be provided for effecting the turning of the laps but for purposes of illustration I have shown a pawl 15 connected with the inner walking beam 9 and adapted to engage ratchet teeth 16 formed on the lower lap 2. It will be seen that the pawl serves at each reciprocation of the plates to turn the laps through a small angle.

Under some circumstances it may be desirable to reciprocate the blocks radially with respect to the laps and it may also be desirable to provide four groups of blocks instead of two groups as shown in Fig. 1. The machine shown in Fig. 3 comprises two laps which are similar in construction and mounting to the laps 1 and 2, shown in Figs. 1 and 2. Four plates $5^a$, $5^a$ and $5^b$, $5^b$ are provided, these being similar in construction to the plates 5, 5 already described. These plates are positioned for radial reciprocation along perpendicular center lines. The plates of each opposite pair $5^a$, $5^a$ or $5^b$, $5^b$ are adapted to move inward in unison or outward in unison. Preferably while the plates of one pair are moving inward the plates of the other pair are moving outward and vice versa. Inasmuch as the reciprocating movements are opposite, it will be seen that the weight of the upper lap is equally divided between all four groups of blocks held by the four plates. Thus I secure equal pressures and equal lapping on all of the blocks as before described.

The mechanism for moving the plates in the way described may vary widely, but for purposes of illustration I have shown slotted links 17, 17 rigidly secured respectively to the plates $5^a$, $5^a$. Stationary guides 18, 18 fit the slots in these links, thus guiding the links and the plates for rectilinear movement. Similar links 19, 19 and guides 20, 20 are provided for the plates $5^b$, $5^b$. The links 17, 17 are provided with cross arms 21, 21 and links 19, 19 are provided with cross arms 22, 22. Diagonal links 23, 23 are pivotally connected to the ends of the several cross arms 21, 21 and 22, 22. It will be seen that the linkage described serves to cause the plates $5^b$, $5^b$ to move outward in unison and the plates $5^a$, $5^a$ to simultaneously move inward in unison. Subsequently the linkage causes the plates $5^a$, $5^a$ to move outward in unison and the plates $5^b$, $5^b$ to simultaneously move inward in unison. For effecting regular reciprocation there is provided a connecting rod 24 engaging a pin 25 on a rotating crank disc 26. For turning the laps a pawl 27 is mounted on the linkage at a convenient place, as, for instance, near the middle of one of the links 23. This pawl engages the ratchet teeth 16 on the lower lap and thus serve to turn both of the laps.

As illustrated in Figs. 1 to 3, each plate 5 or $5^a$ or $5^b$ is provided with a large opening 6 which substantially fits the group of blocks B—B to be lapped. As shown, the blocks are rectangular and the group consists of intersecting rows. I do not, however, limit myself as to the shape of the blocks or as to the exact arrangement. Under some circumstances it may be preferable to provide somewhat different plates as shown in Fig. 4. This figure shows a plate 5ᶜ having a number of small circular apertures 6ᶜ, each adapted to receive a single block. As illustrated, each aperture 6ᶜ is somewhat larger than the block so as to permit the block to turn or roll somewhat as the plate moves and as the laps turn. I have shown blocks A—A which are circular, but it will be understood that I am not limited to circular blocks.

In accordance with my method, either of the machines as shown is operated for a reasonable time, preferably until all of the blocks have been lapped and until the laps engage all of them equally. Then the movement is stopped and one lap, ordinarily the upper lap, is removed, thus leaving the blocks exposed. Certain blocks are then transferred in such a way as to distribute any errors or variations in the respective lengths. It may be assumed that with a group of blocks of slightly varying lengths those at one part of the group will average longer than those at another part. Similarly, when two or more similar groups are provided, it may be assumed that those of one group will average longer than those of another. Following this assumption it will be seen that the transferring must be such that the longer and shorter blocks will be commingled, preferably one or more of the longer blocks being positioned between two or more of the shorter blocks. In order that the longer and shorter blocks may be uniformly distributed, the transferring is preferably effected symmetrically.

The blocks of any one group may be transferred or moved about in a variety of ways, as will be understood from Figs. 5 to 7 which illustrate typical ways of transferring. Fig. 5 can be considered to represent the initial arrangement of the blocks of a group. The blocks can be positioned all in one large opening in the plate, as shown in Figs. 1 to 3, or in individual apertures, as shown in Fig. 4. As illustrated in Fig. 5, there are four longitudinal rows of blocks designated a—b—c—d, and eight transverse rows designated 1—2—3—4—5—6—7—8. As illustrated in Fig. 6, two of the longitudinal rows, as for instance a and c, have been interchanged. As illustrated in Fig. 7, alternate transverse rows, as for instance 2, 4, 6 and 8, have been reversed end for end. It will be clear that the blocks may be transferred in other ways, particularly as set forth in my aforesaid application, Serial No. 309,448, filed July 8th, 1919. It will be seen that the transferring or transposing of the blocks in the ways described serves to equally distribute any errors or variations in length. If the blocks at one side are longer than those at the other side, or if the blocks at one end are longer than those at the other end, the several transpositions or changes will place the longer blocks between the shorter blocks in alternate relationship.

Preferably when two groups of blocks are provided as illustrated in Figs. 1 and 2 or four groups as illustrated in Fig. 3, transferring or transposing is effected not only within each group but also between the groups. Fig. 8 can be considered to represent the initial arrangement of the blocks of the four groups shown in Fig. 3. As illustrated, there are four longitudinal rows of blocks in each group designated a—b—c—d, e—f—g—h, i—j—k—l and m—n—o—p respectively. There are eight transverse rows of blocks in each group designated 1—2—3—4—5—6—7—8, 9—10—11—12—13—14—15—16, 17—18—19—20—21—22—23—24 and 25—26—27—28—29—30—31—32 respectively. As illustrated in Fig. 9 two longitudinal rows of each group have been interchanged with those of the opposite group, as for instance a and i, c and k, e and m and g and o. Also, alternate transverse rows of each group have been interchanged with those of an adjacent group, as for instance 1 and 16, 3 and 14, 5 and 12, 7 and 10, 17 and 32, 19 and 30, 21 and 28, and 23 and 26. It will be clear that transposition can be effected in ways additional to those shown.

The blocks having been transferred as described, the top lap is restored to position and the lapping operation is repeated. Obviously the laps will at first engage only the longer blocks, thus reducing their lengths. The lapping operation is continued preferably until the laps again engage all of the blocks. Obviously the blocks are more nearly uniform in length than before, but there may still be some variation. Therefore transferring is again effected as before described, the manner thereof being varied, and the blocks are again lapped. These operations are repeated alternately in succession for a number of times and the final result is that all of the blocks have exactly the same length and have their end surfaces exactly flat and parallel.

The blocks having been made with identical lengths and with plane parallel end surfaces, the lapping operation is then continued to reduce the lengths to the desired predetermined amount. If considerable additional lapping is required to secure the desired uniform length, it may be preferable to continue the transferring of the blocks from time to time to avoid possible variations. The blocks may be measured in any desired way to ascertain when the predetermined lengths have been reached. Use may be made of the method set forth in my aforesaid application 289,591, but this method constitutes no part of my present invention and need not be here described.

What I claim is:

1. The method of reducing a number of similar blocks to produce parallel flat end faces and identical lengths, which consists in arranging the several blocks in a definite group between two opposed flat laps held against any considerable relative movement, permitting one of the laps to adjust itself as to parallelism to the other lap in accordance with the lengths of the blocks, reciprocating the group of blocks with respect to the laps, and turning the laps with respect to the blocks.

2. The method of reducing a number of similar blocks to produce parallel flat end faces and identical lengths, which consists in arranging the several blocks in a plurality of equal definite groups between two opposed horizontal flat laps, permitting the upper lap to adjust itself with respect to the lower lap in accordance with the lengths of the blocks reciprocating the groups of blocks with respect to the laps so that the weight of the upper lap on the said groups of blocks is always equally divided among them, and turning the laps with respect to the blocks.

3. The method of reducing a number of similar blocks to produce parallel flat end faces and identical lengths, which consists in arranging the several blocks in two equal definite groups between two opposed horizontal flat laps, permitting the upper lap to adjust itself with respect to the lower lap in accordance with the lengths of the blocks, oppositely reciprocating the two groups of blocks with respect to the laps along a common center line so that the weight of the upper lap on the two groups of blocks is always equally divided between them, and turning the laps about an axis intersecting the said center line midway between the groups of blocks.

4. The method of reducing a number of similar blocks to produce parallel flat end faces and identical lengths, which consists in arranging the several blocks in four equal definite groups between two opposed horizontal flat laps, permitting the upper lap to adjust itself with respect to the lower lap in accordance with the lengths of the blocks, and oppositely reciprocating two of the groups of blocks with respect to the laps along a common center line and also oppositely reciprocating the other two of the groups of blocks along another common center line intersecting the first so that the weight of the upper lap is always equally divided among the four groups of blocks.

5. The method of reducing a number of similar blocks to produce parallel flat end faces and identical lengths, which consists in arranging the several blocks in four equal definite groups between two opposed horizontal flat laps, permitting the upper lap to adjust itself with respect to the lower lap in accordance with the lengths of the blocks, and oppositely reciprocating two of the groups of blocks with respect to the laps along a common center line and also oppositely reciprocating the other two of the groups of blocks along another common center line intersecting the first, the groups of one pair moving outward while those of the other pair move inward and vice versa so that the weight of the upper lap is always equally divided among the four groups of blocks.

6. The method of reducing a number of similar blocks to produce parallel flat end faces and identical lengths, which consists in arranging the several blocks in four equal definite groups between two opposed horizontal flat laps, permitting the upper lap to adjust itself with respect to the lower lap in accordance with the lengths of the blocks, oppositely reciprocating two of the groups of blocks with respect to the laps along a common center line and also oppositely reciprocating the other two of the groups of blocks along another common center line intersecting the first so that the weight of the upper lap is always equally divided among the four groups of blocks, and turning the laps about an axis at the intersection of the said center lines.

7. The method of reducing a number of similar blocks to produce parallel flat end faces and identical lengths, which consists in arranging the several blocks in four equal definite groups between two opposed flat laps, permitting the laps to adjust themselves as to parallelism in accordance with the lengths of the blocks, moving the groups of blocks with respect to the laps in different directions to effect lapping, interchanging some of the blocks of each group with some of the blocks of the opposite group to distribute variations in length and repeating the lapping operation.

8. The method of reducing a number of similar blocks to produce parallel flat end faces and identical lengths, which consists in arranging the several blocks in four equal definite groups between two opposed flat laps, permitting the laps to adjust themselves as to parallelism in accordance with the lengths of the blocks, moving the groups of blocks with respect to the laps in different directions to effect lapping, interchanging some of the blocks of each group with some of the blocks of one of the adjacent groups to distribute variations in length, and repeating the lapping operation.

9. The method of reducing a number of similar blocks to produce parallel flat end faces and identical lengths, which consists in arranging the several blocks in four equal definite groups between two opposed flat laps, permitting the laps to adjust themselves as to parallelism in accordance with the lengths of the blocks, moving the groups of blocks with respect to the laps in different directions to effect lapping, interchanging some of the blocks of each group with some of the blocks of the opposite group to distribute variations in length, interchanging some of the blocks of each group with some of the blocks of one of the adjacent groups to further distribute variations in length, and repeating the lapping operation after each interchanging.

10. The method of reducing a number of similar blocks to produce parallel flat end faces and identical lengths, which consists in arranging the several blocks in four equal definite groups between two opposed flat laps, permitting the laps to adjust themselves as to parallelism in accordance with the lengths of the blocks, moving the two groups of blocks with respect to the laps in different directions to effect lapping, transferring some of the blocks within each group to distribute variations in length, interchanging some of the blocks of each group with some of the blocks of another group to further distribute variations in length, and repeating the lapping operation after each transferring and interchanging.

11. A lapping machine including in combination, two opposed laps having flat working surfaces, one lap being adapted to freely adjust itself with respect to the other lap as concerns parallelism, a plate positioned between the laps and adapted to engage blocks to be lapped, means for reciprocating the plate between the laps, and means for turning the laps.

12. A lapping machine including in combination, two opposed laps having flat working surfaces, one lap being adapted to freely adjust itself with respect to the other lap as concerns parallelism, two similar plates positioned between the laps and having openings therein for blocks to be lapped, means for reciprocating the two plates oppositely between the laps, and means for turning the laps.

13. A lapping machine including in combination, two opposed laps having flat working surfaces, one lap being adapted to freely adjust itself with respect to the other lap as concerns parallelism, two similar plates positioned between the laps and having openings therein for blocks to be lapped, means for reciprocating the two plates between the laps toward and from each other, and means for turning the laps about an axis midway between the plates.

14. A lapping machine including in combination, two opposed horizontal laps having flat working surfaces, the upper lap being freely movable vertically and adapted to adjust itself with respect to the other, a plurality of similar plates positioned between the laps and having openings therein for blocks to be lapped, the said plates being symmetrically located with respect to the upper lap so that the weight of the latter on the blocks engaged by the respective plates will be equally divided among them, means for reciprocating the plates so that they remain symmetrically disposed with respect to the upper lap, whereby the weight of the said lap remains equally divided among the groups of blocks as aforesaid, and means for turning the laps about a central axis.

15. A lapping machine including in combination, two opposed laps having flat working surfaces, one lap being adapted to freely adjust itself with respect to the other lap as concerns parallelism, four similar plates positioned between the laps and having openings therein for blocks to be lapped, means for reciprocating two of the plates oppositely along a common center line, and means for reciprocating the other two plates oppositely along another common center line intersecting the first.

16. A lapping machine including in combination, two opposed laps having flat working surfaces, one lap being adapted to freely adjust itself with respect to the other lap as concerns parallelism, four similar plates positioned between the laps and having openings therein for blocks to be lapped, means for reciprocating two of the plates oppositely along a common center line, and means for reciprocating the other two plates oppositely along another common center line intersecting the first, the last said means moving the corresponding plates outward while the first said means is moving the other plates inward and vice versa.

17. A lapping machine including in combination, two opposed laps having flat working surfaces, one lap being adapted to freely adjust itself with respect to the other lap as concerns parallelism, four similar plates positioned between the laps and having openings therein for blocks to be lapped, means for reciprocating two of the plates oppositely along a common center line, means for reciprocating the other two plates oppositely along another common center line intersecting the first, and means for turning the laps about an axis midway between the plates.

18. A lapping machine including in combination, two opposed horizontal laps having flat working surfaces, the upper lap being freely movable vertically and adapted to adjust itself with respect to the other, four similar plates positioned between the laps and having openings therein for blocks to be lapped, the said plates being symmetrically located with respect to the upper lap so that the weight of the latter will be equally divided among the groups of blocks engaged by the respective plates, means for reciprocating two of the plates oppositely along a common center line, and means for reciprocating the other two plates oppositely along another common center line intersecting the first, the two said reciprocating means serving to maintain the said plates symmetrically disposed with respect to the upper lap, whereby the weight of the said lap remains equally divided among the groups of blocks as aforesaid.

In testimony whereof, I hereto affix my signature.

WILLIAM E. HOKE.